United States Patent [19]
Betz

[11] 3,919,879
[45] Nov. 18, 1975

[54] ELECTRICAL ZEROING MEANS FOR A DILATOMETER

[75] Inventor: Karl Betz, Dix Hills, N.Y.

[73] Assignee: Theta Industries, Inc., Port Washington, N.Y.

[22] Filed: Sept. 3, 1974

[21] Appl. No.: 502,989

[52] U.S. Cl. .................................... 73/16; 336/30
[51] Int. Cl.² .......................................... G01N 25/16
[58] Field of Search .................. 73/16; 336/30, 136

[56] References Cited
UNITED STATES PATENTS

| | | | |
|---|---|---|---|
| 3,197,722 | 1/1965 | Chass.................................. | 336/30 |
| 3,218,590 | 11/1965 | Gerstine............................... | 336/30 |
| 3,302,148 | 1/1967 | Nevius.................................. | 336/30 |
| 3,368,393 | 1/1968 | Wilson et al......................... | 336/30 |
| 3,377,838 | 4/1968 | Kanazawa et al.................... | 73/16 |
| 3,601,732 | 8/1971 | Samuels et al...................... | 336/30 |
| 3,680,357 | 8/1972 | Clusner................................. | 73/16 |
| 3,735,639 | 5/1973 | Akeley................................. | 336/30 |

*Primary Examiner*—Herbert Goldstein
*Attorney, Agent, or Firm*—Leonard H. King

[57] ABSTRACT

In a dilatometer, of the type using a linear, variable, differential transformer that includes two pairs of cantilevered leaf springs for resiliently and independently supporting the core and the coil thereof, adjustment means are provided for axially displacing the core relative to the coil to thereby electrically zero the core. In one embodiment of the present invention, a rod is coupled to the opposed end surfaces of the core and is also threadably engaged in the two outboard springs that support the core whereby rotational movement of the rod causes axial displacement of the core relative to the coil. In an alternative embodiment of the present invention, the core is contained within a sleeve that is secured to and mounted between the two outboard leaf springs that support the core. An adjustment rod is threaded into one end of the sleeve and abuts one end of the core. A compression spring which is also contained within the sleeve and which is positioned at the end of the core opposite the rod exerts an oppositely directed restoring force on the other end of the core that is opposite the rod.

The aforementioned Abstract is neither intended to define the invention of the application which, of course, is measured by the claims, nor is it intended to be limiting as to the scope of the invention in any way.

3 Claims, 3 Drawing Figures

ELECTRICAL ZEROING MEANS FOR A DILATOMETER

BACKGROUND OF THE INVENTION

1. Field of the Invention

This invention relates generally to measuring instruments such as dilatometers or the like and more particularly to improved, electrical zeroing means for a linear, variable, differential transformer used with the dilatometer.

2. Description of the Prior Art

Dilatometers are used for measuring the linear, thermal expansion of solids. They are also used for determining the coefficient of linear, thermal expansion as well as to detect phase transitions in a material for analytical purposes. Some applications of the dilatometer include a measurement of the change in the crystallographic structure of a material. That is, the transition point and softening point in plastics, or the continuous cooling period of transformation in steel. Another application of a dilatometer is the study of the compatability of materials under changing temperature conditions. For example, metal to glass, enamel to substrates, thin film depositions on microcircuits or matching tooth filings with the natural material teeth. A dilatometer may also be used for process simulation such as firing of ceramics, heat treating of metals (annealing and quenching), sintering of powders and composite materials and measurement of minerals.

A common dilatometer consists mainly of three major sections, a furnace with a temperature control, the actual dilatometer with a measuring unit and suitable recording equipment. However, there are only a very limited number of dilatometer measuring units. One widely used dilatometer has a ball bearing push rod support. This construction has the disadvantage of moving freely only under ideal conditions. Thus, dried out oil and improper adjustment make the functioning of the instrument questionable and hence the output of the device unreliable.

Other forms of dilatometer are illustrated and disclosed in U.S. Pat Nos. 3,680,357 and 3,805,589, both granted to Gerhard Clusener on Aug. 1, 1972 and Apr. 23, 1974, respectively. The structure described in the aforementioned issued patents overcomes the shortcomings of the previously mentioned prior art and provides particular advantages where only a limited space is available such as in vacuum chambers, hot cells, etc. The structure disclosed in the two aforementioned patents provides compactness to thereby minimize temperature and differential effects. In both instances a ball anvil couples a linear, variable, differential transformer that is adjustable and a micrometer that is used for calibration purposes. Interleaved springs individually and independently support the coil and the core of the linear, variable, differential transformer. The test sample is mounted between push rods, one of which is responsible to the movement of the core. In the structure disclosed in the aforementioned issued patents, the work pieces were supported in a fused quartz tube that is adapted to be positioned within a furnace. When the furnace is brought up to temperature, the expansion of the test sample is transferred through the push rod into the measuring head. The linear, variable, differential transformer changes the variation in the length of the sample into an electrical signal and a demodulator conditions the signal for suitable recorder display.

SUMMARY OF THE INVENTION

The present invention is particularly directed to providing improved means for electrically zeroing the linear, variable, differential transformer in a dilatometer, of the type described hereinabove. Adjustment means are provided for axially displacing the core relative to the coil of the linear, variable, differential transformer to thereby permit electrical zeroing of the core. In one embodiment of the present invention a stainless steel rod is threadably engaged in the two outboard cantilevered leaf springs that support the core so that rotation movement of the rod causes axial displacement of core relative to the coil. In an alternative embodiment of the present invention the core of the linear, variable, differential transformer is contained within a quartz or non-electrical conductive and non-magnetic sleeve that is secured to and mounted between the two outboard cantilevered leaf springs that support the core. The adjustment rod is threaded into one end of the sleeve and abuts a first end of the core. A non-magnetic compression spring, which is also contained within the sleeve, exerts an oppositely directed restoring force on the opposite, second end of the core. Accordingly, it is a primary object of the present invention to provide improved means for zeroing the core relative to the coil of a linear, variable, differential transformer, such as is used in a dilatometer.

Another object of the present invention is to provide a rotatable adjusting rod that is arranged to axially displace the core relative to the coil of a linear, variable, differential transformer, such as is used in a dilatometer.

A particular object of the present invention is to provide in the adjustment means described hereinabove, spring means for exerting a force on the core, the force being opposite in direction to the axial displacement of the core.

These and other features, objects and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the various figures of the drawing, like reference characters designate like parts. In the drawing.

DESCRIPTION OF THE PREFERRED EMBODIMENTS

Figure 1:
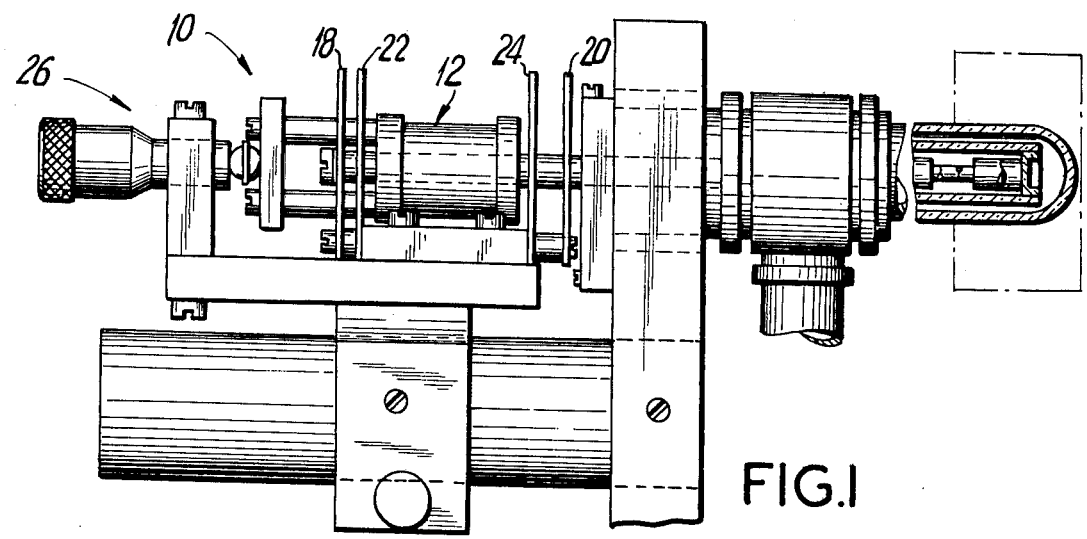
FIG. 1 is a fragmentary elevational view, partially in section, illustrating a typical dilatometer that is capable of utilizing the adjustment means comprising the present invention.

A typical dilatometer 10, such as may utilize the present invention is shown in FIG. 1. For a complete description of the structure and function of the dilatometer 10, reference may be had to the aforementioned U.S. Pat. Nos. 3,680,357 and 3,805,589. However, for the purpose of the description of the present invention it will be noted that the dilatometer 10 includes a linear, variable, differential transformer 12 that is comprised of a central core 14 having a coil 16 formed concentrically thereabout. The core 14 is supported, as described more fully in the aforementioned U.S. patents, by means of two outboard, cantilevered leaf springs 18 and 20. The coil 16 is supported, as also described more fully in the aforementioned U.S. patents by two inward, cantilevered leaf springs 22 and 24. A micrometer assembly, generally designated by the reference character 26 is used for calibration purposes and is arranged to axially displace the coil 16 of the linear, variable, differential transformer 12.

Figure 2:
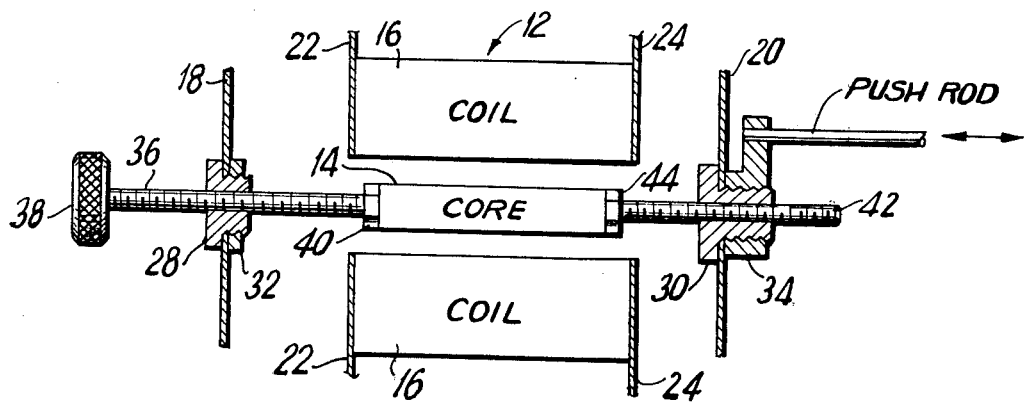
FIG. 2 is a schematic plan view, partially in section, illustrating one embodiment of the adjustment means comprising the present invention.

The present invention is utilized when it is necessary to electrically adjust and zero the core 14 relative to the coil 16. In the embodiment illustrated in FIG. 2 a first mounting nut 28 that is both externally and internally threaded is secured to the first cantilevered leaf spring 18 in any suitable manner. Similarly, a second mounting nut 30 that is both externally and internally threaded is secured to the second cantilevered leaf spring 20 in any suitable manner. Clamp nuts 32 and 34 engage the external threads of the mounting nuts 28 and 30, respectively. As shown in FIG. 2 the push rod of the core may be mounted on the clamp nut 34.

A finely threaded, stainless steel, non-magnetic rod 36 having an integral adjusting knob 38 at one end thereof is threaded through the mounting nut 28 and engages the left hand end of the core 14 as shown in FIG. 2. A clamping nut 40 may be used to secure the right hand end of the rod 36 to the core 14. At the opposite end of the core 14 there is coaxially provided a second, finely threaded stainless steel, non-magnetic rod 42 that is threaded through the second mounting nut 30. It is to be appreciated that a single rod may comprise rods 36 and 42. A clamping nut 44 may also be used to secure the left hand end of the rod 42 to the right hand end of the core 14 as seen in FIG. 2. It will be appreciated from the foregoing that rotational movement of the adjusting knob 38 will cause axial movement of the threaded rods 36 and 42 to thereby provide axial displacement of the core 14 relative to the coil 16.

Figure 3:
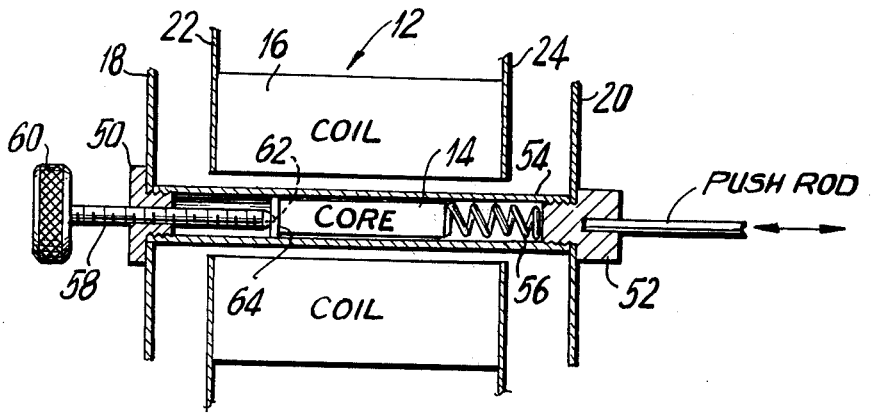
FIG. 3 is another schematic plan view, partially in section, illustrating an alternative embodiment of the adjustment means comprising the present invention.

An alternative embodiment of the present invention is shown in FIG. 3. In this second embodiment, a pair of mounting nuts 50 and 52 are suitably secured in any convenient manner to the cantilevered leaf springs 18 and 20, respectively. The mounting nut 50 is both internally and externally threaded while, for purposes to be described later, the mounting nut 52 is only externally threaded. A quartz, non-magnetic sleeve 54 is secured to the external surfaces of the mounting nuts 50 and 52 in any suitable manner such as by mating threads adhesive or the like. The core 14, together with a non-magnetic compression spring 56 is mounted within the sleeve. As shown in FIG. 3, the compression spring 56 is positioned between the right hand end face of the core 14 and the inner, left hand end face of the mounting nut 52. A finely threaded stainless steel, non-magnetic rod 58, having an integral, external adjusting knob 60 at one end thereof, is threaded into and through the left hand mounting nut 50. The right hand end of the threaded rod 50 has a conical point 62 that is engaged in a mating, conical recess formed in a washer 64 that is interposed between the conical point 62 and the left hand end face of the core 14. It will be appreciated from the foregoing that, as the adjusting knob 60 is rotated, the threaded rod 58 will be displaced axially to the right causing axial displacement of the core 14 in the same direction. Axial displacement of the core 14 causes the spring 56 to compress and thereby impart an oppositely directed, restoring force to the right hand end of the core 14 as seen in FIG. 3. The spring 56 may be used to compensate for any dimensional inaccuracies in the mating threads of the mounting nut 50 and the adjusting rod 58. As shown in FIG. 3 the push rod for the core 15 may be secured to the mounting nut 52 in any suitable manner.

While externally threaded mounting nuts 28 and 30 have been illustrated by way of example, it will be evident that other mounting arrangements could be used in place. For example the mounting nuts 28 and 30 could be permanently secured to their respective leaf springs 18 and 20 such as by brazing, welding, soldering or the like or by a suitable adhesive. It should be further noted that the threaded rods 36 and 42 could be a single, integral entity if the core 14 is made hollow. Thus, in its broadest aspect, the present invention includes rod means having a first threaded portion that mates with the first mounting nut and a second portion that couples the other end of the core 14 to the second leaf spring 20. In the first embodiment illustrated the second portion or coupling means is defined by the rod 42 whereas in the second embodiment illustrated the second portion or coupling means would be the spring 56.

There has been disclosed heretofore the best embodiments of the invention presently contemplated. However, it is to be understood that various changes and modifications may be made thereto without departing from the spirit of the invention.

What I claim as new and desire to secure by Letters Patent is:

1. In combination with a dilatometer of the type using a linear, variable, differential transformer that includes an annular, axially elongated coil, an axially elongated displaceable core positioned within the coil and first and second pairs of leaf springs for resiliently and independently supporting the coil and the core, respectively, at opposite ends thereof; improved adjusting means for axially displacing the core relative to the coil independently of the supporting springs, said adjusting means comprising:
    a. a non-magnetic sleeve mounted between a pair of said leaf springs, said core being slidably carried within said sleeve;
    b. at least one internally threaded member secured to one of the leaf springs that support the core;
    c. rod means having a first threaded rod portion mating with said internally threaded member and an end in engagement with one end of the core whereby rotation of said first threaded portion of said rod means relative to said internal threaded member causes axial displacement of the core within said sleeve relative to the coil; and
    d. a spring positioned within said sleeve, said spring being interposed between the end of the core remote from said first threaded rod portion and said other core supporting leaf spring.

2. The adjustment means according to claim 1 wherein said first threaded portion of said rod means has a conical end that is in engagement with the end of the core that is adjacent thereto.

3. The adjusting means according to claim 1 wherein said sleeve is secured to said two supporting springs.

* * * * *